April 1, 1952         G. T. RANDOL         2,590,888

CONTROL VALVE MEANS FOR FLUID-ACTUATED SERVOMOTORS

Filed Oct. 2, 1947         3 Sheets-Sheet 1

INVENTOR:
Glenn T. Randol,
BY
ATTORNEY.

Patented Apr. 1, 1952

2,590,888

UNITED STATES PATENT OFFICE 2,590,888

CONTROL VALVE MEANS FOR FLUID-ACTUATED SERVOMOTORS

Glenn T. Randol, Fort Lauderdale, Fla.

Application October 2, 1947, Serial No. 777,448

19 Claims. (Cl. 121—38)

This invention relates to control means and more particularly to novel and improved valve means for controlling fluid-actuated servomotors having a movable element.

One of the primary objects of the invention is to produce improved control valve means for a fluid-actuated servomotor whereby the movable element of said servomotor may have its movement from one position to another controlled at will.

Another object is to produce novel control means for a fluid pressure actuated servomotor including improved valve means embodying a conditioning valve element and a control valve element, together with actuating means for said elements.

Yet another object is to produce improved control valve means for a fluid-actuated servomotor whereby the movable element of the servomotor may be so controlled by an actuating member, that the movable element can be caused to move from one position to another and a return to the said one position by successive movements of the actuating member.

Still another object is to embody in said control valve means, independently actuated means for disabling the control of the valve means by the said actuating member that is employed to cause the valve means to be operated to thereby control the movement of the movable element of the servomotor in the manner aforesaid.

A further object is to produce a control valve means for a fluid pressure operated servomotor in which a rotatable valve element can be placed with step-by-step movements thereof in a single direction in different operative positions and thereby control the movable element of the servomotor so as to have a reciprocable movement.

A still further object is to provide control valve means for a fluid-actuated servomotor which will embody independent valve elements controllable by manually and pedally actuated means to produce a reciprocable movement of the movable element of the servomotor.

An object related to that last stated is to so control the valve means by the aforementioned actuated means that the manually actuated means is employed to condition the valve means and the pedally-controlled means is employed to control the reciprocable movement of the movable element of the servomotor, said conditioning of the valve means for operation or non-operation of the servomotor being arranged to be accomplished irrespective of the position of the movable element of the servomotor.

A further object is to so control the type of valve means referred to that the movable element of the servomotor will always be caused to move to one end of its reciprocable movement, if not already so positioned, whenever the valve means is conditioned for operation by the pedally actuated means employed to control reciprocable movement of the movable element of the servomotor.

A more specific object is to produce an improved rotatable valve element for alternately connecting opposite ends of a double-acting fluid-actuated servomotor to a source of fluid pressure different from atmosphere and to the atmosphere.

Other objects of the invention will become apparent from the following description taken in connection with the accompanying drawings.

Figure 1:
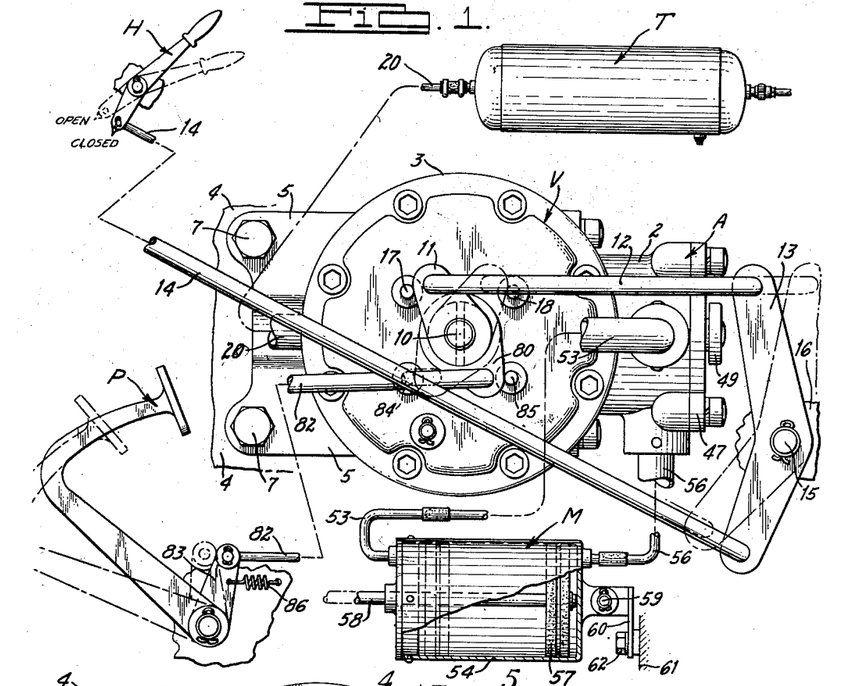
Figure 1 is a somewhat schematic side view of a control system for a fluid-actuated servomotor incorporating the present invention, said view showing the control valve means, the pedal control means therefor, the manual control means, the source of fluid pressure and the servomotor with the parts thereof in their inoperative positions.

Referring to the drawings in detail and first to Figure 1, which shows the entire control system including the improved valve means, said improved valve means being indicated generally by the letter V. The fluid-actuated servomotor which is to be controlled is indicated by the letter M and is of the double-acting piston type. The source of fluid pressure for operating the servomotor is shown as a tank T and this source may be either a subatmospheric pressure or a superatmospheric pressure or motive fluid may be employed. However, in connection with the particular system disclosed, the source of fluid pressure will be considered as being a partial vacuum or subatmospheric. The improved valve means V is arranged to be controlled by two personally operated means which are shown by way of example, as a hand lever H and a pedal P.

As shown in the various views, the improved valve means embodies two control valve elements, one of which is a shut-off or conditioning valve element indicated by the letter C and the other a selecting control valve element indicated by the letter A and arranged to connect the opposed ends of the servomotor M alternately to the source of fluid pressure and to the atmosphere. The improved control valve means is enclosed in a casing comprising a main casing member 1 and an auxiliary casing member 2, bolted together in a manner indicated. Associated with these two casing members is a cover plate 3. The main casing member 1 is arranged to be mounted on any suitable support 4 by a mounting bracket 5. Bolts 6 connect the casing member to the bracket and bolts 7 connect the bracket to the support.

Figures 7, 8, 11:
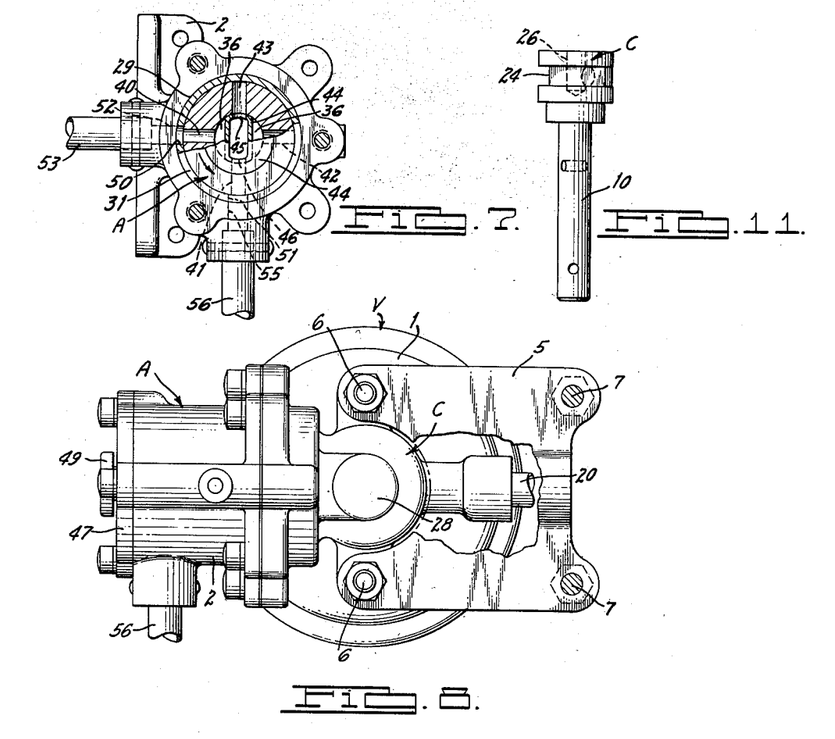
Figure 7 is another sectional view similar to that of Figure 5, but showing the servomotor controlling valve element in the position assumed by depressing the pedal and thereby causing the servo-piston to be moved to the dashed line position shown in Figure 1.
Figure 8 is an end view from the right end of Figure 1 of the control valve means showing the mounting bracket.
Figure 11 is a view of the conditioning valve element per se and its actuating shaft.
Figure 9:
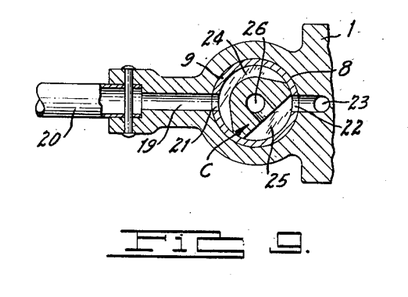
Figure 9 is a sectional view taken on the line 9—9 of Figure 3 showing the conditioning valve element in the closed position.
Figure 10:
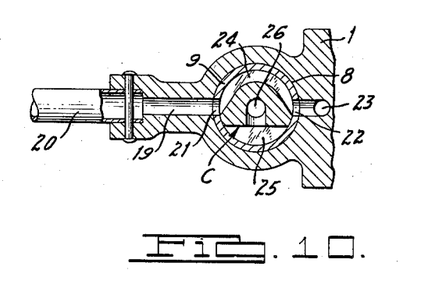
Figure 10 is a sectional view similar to that of Figure 9, but showing the conditioning valve element in its open position.

The main casing member 1 is provided with a bore 8 having a bearing sleeve 9 and within this sleeve is rotatably mounted the conditioning valve element C shown per se in Figure 11. This conditioning valve element C is formed with an integral actuating shaft 10 which is arranged to extend across the main casing member 1 and through the cover plate 3 to the exterior side thereof. The outer end of this shaft 10 has pinned thereto a short arm 11 whereby the conditioning valve element C can be operated by the already referred to hand lever H to thereby place the valve element in either a closed position (Figure 9) or an open position (Figure 10). The connection between the arm 11 and the hand lever comprises a link 12 connecting the arm 11 to one end of a double arm lever 13. A second link 14 connects the other arm of this double arm lever to the hand lever H. The double arm lever is rockable on a pin 15 mounted on any suitable support 16.

The arm 11, attached to the outer end of the shaft 10 of the conditioning valve element C, is arranged to engage limiting stop pins 17 and 18 carried by the cover plate. The pins are so spaced that the shaft 10 can be given a rotation by the hand lever through an arc of substantially 45 degrees, this being sufficient to place the conditioning valve element C in its closed and open positions. When the arm 11 is moved by the hand lever to engage the stop pin 17, as shown in full lines in Figure 1, the conditioning valve element will be in its closed or shut off position. When the arm 11 is moved to engage the stop pin 18, as shown in dashed lines in Figure 1, the conditioning valve element will be in its open position.

The main casing member 1 is provided with a passage 19 which is connected at its outer end by a pipe 20 to the tank T. The inner end of the passage 19 is placed in communication with the interior of the valve sleeve bearing 9 by a port 21. Diametrically opposite this port 21 is a second port 22 in the sleeve which places the interior of the sleeve in communication with the passage 23 formed by drilled sections in the casing members and leading to the selecting valve A which is mounted in the auxiliary casing 2. The valve element C, as best shown in Figures 9, 10 and 11, is of cylindrical shape and has cut in its cylindrical surface a partial annular groove 24 extending substantially 180 degrees around the valve. Opposite this groove is a cross slot 25 which is arranged to communicate with an axial passage 26 in the valve element. When the valve element is mounted in the sleeve 9, the axial passage 26 will be in communication with a passage 27 in the main casing 1, thus placing the cross slot 25 in communication with the atmosphere at all times. The outer end of the passage 27 has a breather cap 28 associated therewith as shown in Figure 3.

With the conditioning valve element C constructed as shown and mounted in the main casing member 1, it will be seen that when the hand lever H is in the position shown in Figure 1, the valve element C will be caused to assume the position shown in Figure 9. Under such conditions the tank T will be cut off from communication with the passage 23 leading to the valve element A and said passage 23 will be in communication with the atmosphere. This is the closed or shut off condition of the conditioning valve element. When the hand lever H is moved to its dashed line position, the valve element C will be placed in the position shown in Figure 10, and under such conditions the tank T will communicate with the passage 23, since then the groove 24 will have its opposite ends in communication with the ports 21 and 22. This is the open position of the conditioning valve element C.

Figure 3:
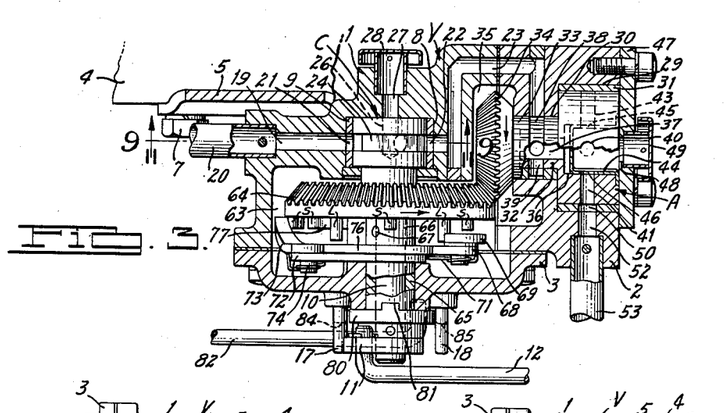
Figure 3 is a horizontal sectional view of the control and conditioning valve means as viewed on the line 3—3 of Figure 2 with certain parts being shown in full and others fragmentarily broken away.
Figure 4:
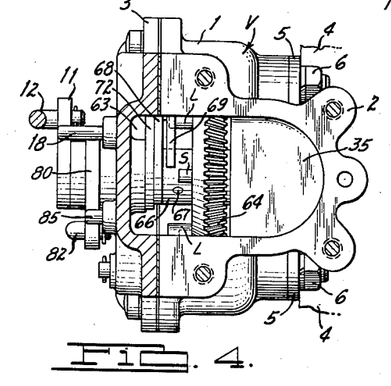
Figure 4 is a transverse sectional end view taken on the line 4—4 of Figure 2 and showing the control valve removed.
Figure 5:
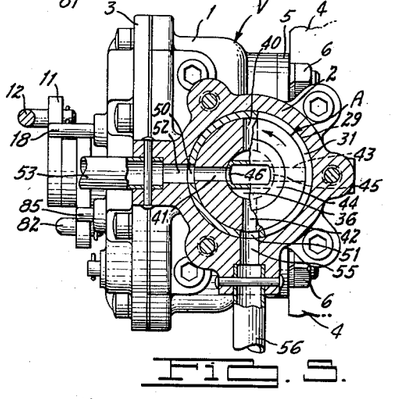
Figure 5 is a transverse sectional view of the valve means taken on the line 5—5 of Figure 2 and showing the servomotor controlling valve element in the position assumed for placing the piston of the servomotor in the position shown in Figure 1.

As is best shown in Figures 3, 5 and 7, the auxiliary valve casing member 2 is provided with a stepped bore comprising an outer larger bore 29 and an inner smaller bore 30. The valve element A is of cylindrical form and is positioned in a bearing sleeve 31 in the larger bore. The valve element has an extension 32 which is press-fitted into the hollow end of a shaft 33 journaled in the smaller bore 30. This shaft 33 carries an integral beveled gear 34 positioned in a compartment 35 between the main and auxiliary casing members. The cylindrical valve element A has an axial bore 36 which is in constant communication with an axial passage 37 in the extension 32, which axial passage communicates with an annular groove 38 in the shaft 33 by way of holes 39 bored through the extension 37 and the shaft. The groove 38 is so arranged in the shaft 33 that it will communicate at all times with the previously referred to passage 23 coming from the conditioning valve element C and drilled in the two casing members. With this arrangement it is seen that the passage 23 will at all times communicate with the axial bore 36 in the valve element A.

The valve element A is provided with four radially extending passages 40, 41, 42 and 43 which are arranged to be 90 degrees apart. In order that two of these passages, namely, the opposing passages 40 and 42, may be in constant communication with the bore 36 of the valve element and the other two opposed passages 41 and 43 may be in communication with the atmosphere, there is provided a cup 44 of general rectangular cross section which is pressed fitted into the bore 36. The cup is so arranged in the bore that the inner ends of the passages 40 and 42 will not be obstructed and thus will be free to communicate with the bore 36. The short curved sides of the cup which have the press fit in the bore are opposite the inner ends of the passages 41 and 43 and in order that these passages may be in communication with the interior of the cup, there are provided holes 45 and 46 coinciding with passages 41 and 43. The valve element A is maintained in the sleeve 31 by a cover plate 47 which has an opening 48 therein so as to place the open end of the cup 44 in communication with atmosphere. A breather cap 49 is associated with the opening 48.

The bearing sleeve 31 for the valve element is provided with a side port 50 and a bottom port 51 spaced 90 degrees apart. The side port 50 communicates with a passage 52 in the casing member 2 and connected to this passage is a pipe 53 leading to the left end of the cylinder 54 of the servomotor M shown in Figure 1. The bottom port 51 also communicates with a passage 55 in the casing 2 and a pipe 56 connects this passage to the right end of the cylinder of the servomotor M. The cylinder 54 of the servomotor M is closed at both ends and within the cylinder is a piston 57 having a piston rod 58 extending out of the left end wall of the cylinder. The right end wall of the cylinder is pivotally mounted by a pivot pin 59 to a bracket 60 which can be attached to any suitable support 61 by means of bolts 62 (one only being shown).

From the foregoing description of the valve element A and associated structure, it will be seen that the passage 23 can be alternately connected to the opposite ends of the servomotor M if the valve element A is rotated in steps of 90 degrees. The structure for rotating the valve element through such steps will be described in connection with the rotating of the beveled gear 34 which is arranged to rotate the valve element A. If the valve element A, for example, is in the position shown in Figure 5, the left end of the servomotor will be in communication with the atmosphere and the right end of the servomotor will be in communication with the passage 23, and if the conditioning valve element C is open, it will be in communication with the source of partial vacuum in the tank T. Thus, differential fluid pressure will be effective on the piston 57 of the servomotor so as to cause it to move to the right end of the cylinder thereof, the position shown in Figure 1. If the valve element A should be moved 90 degrees in a counter-clockwise direction, as indicated by the arrows in Figures 5 and 7, the radial passages of the valve element A will be so positioned that the left end of the servomotor will be placed in communication with the source of partial vacuum in the tank T and the right end of the servomotor will be placed in communication with atmosphere. Consequently the differential fluid pressure acting on the piston 57 of the servomotor will cause the piston to move to the left end of the cylinder, the position indicated by dashed lines in Figure 1. A position of the valve A to bring about the movement of the piston 57 to the left end of the cylinder is shown in Figure 7. If the valve element A should be rotated another 90 degrees from the position shown in Figure 7, then a valve element position will again exist wherein the radial passages in the valve element will connect the right end of the servomotor to the source of partial vacuum and the left end of the servomotor to atmosphere so that the piston will be moved by differential fluid pressure to the right end of the servomotor. As the valve element is continued to be moved in steps of 90 degrees, it will be seen that the servomotor will have its opposite ends alternately connected to the partial vacuum and to the atmosphere so as to produce a reciprocal movement to the piston 57. If at any time the conditioning or shut-off valve element C should be moved to its closed position, as shown in Figure 9, then of course the passage 23 will be connected to atmosphere. As a result, the inner ends of the radial passages 40 and 42 in the valve element A will also be connected to atmosphere and consequently with the other radial passages 41 and 43 constantly in communication with atmosphere, there can be no differential fluid pressure established and capable of acting on the piston of the servomotor and it will not be moved from its position at either end of the servomotor, whichever position may exist at the time when the conditioning valve element C is closed.

The valve element A, which controls the reciprocation of the piston of the servomotor, is arranged to be rotated by the operation of the previously mentioned pedal P shown in Figure 1. This is accomplished by providing a second beveled gear 64 in a compartment 63 in the main casing 1. This beveled gear is journaled to rotate on the shaft 10 of the valve element C, as is clearly shown in Figure 3. The beveled gear 64 has twice the number of teeth as the beveled gear 34 with which it meshes so that it will only be necessary to rotate the beveled gear through a 45 degree angle to obtain a 90 degree rotation of the valve element A. On the back side of the large beveled gear 64 are a plurality of alternately arranged short and long pins S and L, respectively. The pins are arranged 45 degrees apart and since there are alternately short and long pins, the short pins will be 90 degrees apart, as will also be the long pins.

Figure 2:
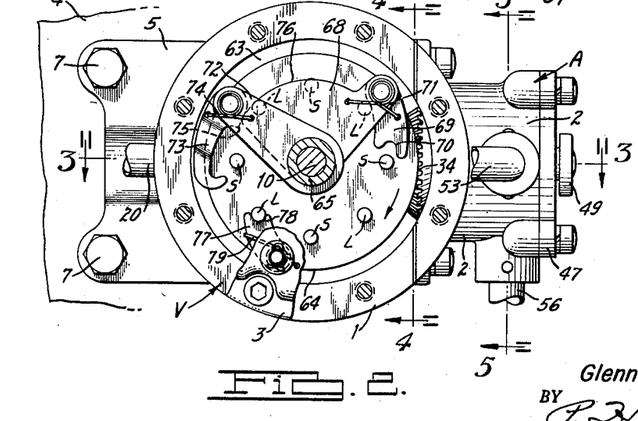
Figure 2 is a view of the control valve means in Figure 1 with the cover plate removed to expose the two actuating pawls controlled by the personally operated means shown by way of example, as a hand lever and a pedal.

The shaft 10 of the valve element C, in addition to having the beveled gear 64 rotatably mounted thereon, has a sleeve 65 rotatably mounted thereon outwardly of the gear, said sleeve also serving as a bearing for the shaft at the point that passes through the cover plate 3. Interposed between the beveled gear 64 and the sleeve 65 is a second sleeve 66 mounted on the shaft 10 and secured thereto by a pin 67 so as to be rotatable with the shaft. This second sleeve 66 carries a sector shaped arm 68, as best shown in Figure 2. On the upper right hand corner of this arm, as viewed in Figure 2, there is pivotally mounted a pawl 69 provided with a recess 70 on its outer end for receiving the long pins L only on the beveled gear 64. A spring 71 is associated with the pawl so as to normally bias it into a position wherein it can engage the long pins in the event of rotation of the sector arm. The spring, however, provides for the pawl 69 to be yieldably pushed out of the way by the long pins in the event the beveled gear is rotated relatively to the sector arm and in a clockwise direction, as shown by the arrow in Figure 2.

Figure 6:
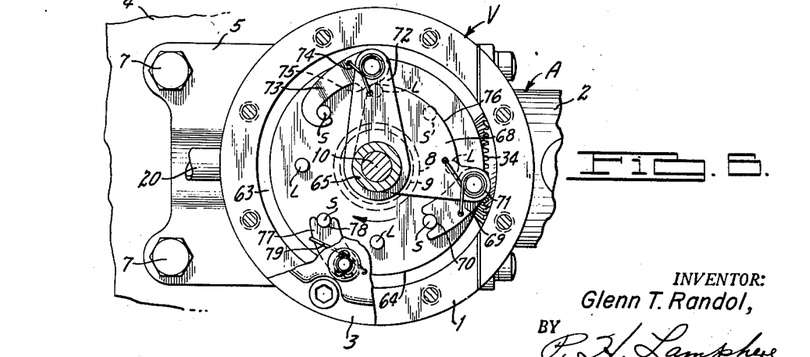
Figure 6 is a view similar to Figure 2, but showing the parts in the positions assumed when the hand lever is placed in open position and the pedal is depressed to the dashed line position shown in Figure 1.

The sleeve 65, which is rotatable upon the shaft 10, has secured thereto at its inner end adjacent the sleeve 66, a radially extending arm 72 and pivotally mounted on the outer end of this arm is a hook 73 which is so arranged as to engage both the short and long pins S and L. A spring 74 normally biases this hook to a position wherein it can engage a pin. The hook 73 is also provided with a cam portion 75 for cooperation with the curved outer surface 76 of the sector arm 68 already referred to. The cam portion is so arranged that in the event the arm 72 is moved in a clockwise direction, as viewed in Figure 2, it will ride up on the curved surface 76 and insure that the hook 73 will be maintained in its outer position wherein it will not be possible for it to engage any pin. In Figure 2 the sector arm 68 is shown in the position it will assume when the conditioning valve element C is placed in its closed position. The arm 72 is also shown in its normally inoperative position and under such conditions the cam portion 75 will be engaged by the left hand end of the curved surface 76, as viewed in Figure 2, thereby holding the hook in its outer position wherein it cannot engage either a long or short pin. If the arm 72 should be rotated in a clockwise position from the position shown in Figure 2, the cam portion will continue to ride onto the curved surface 76 and the hook will be maintained in its non-pin engaging condition. If the conditioning valve element C is moved to its open position, then the sector arm 68 will be rotated to the position shown in Figure 6. Consequently the cam portion 75 will be no longer capable of engaging the curved surface 76 and thus the spring 74 will bias the hook into a position so it can engage the pin next to the hook. Then, under these conditions, if the arm 72 is rotated in a clockwise direction, the hook will pick up the pin opposite it and thereby connect the arm 72 to the large beveled gear and as the arm 72 rotates, the beveled gear 64 will also be rotated, thereby moving the valve element A. As will later be described, the arm 72 will have a swinging movement through an arc of 45 degrees and it will move the large beveled gear 64 through a 45 degree rotation in a clockwise direction. The arm can be returned to its normal inoperative position shown in Figure 2, and during this return movement the hook will be free to swing outwardly against the action of the spring 74 and thus avoid operative engagement with any pin which may be in its path. It will be noted that when the valve element C is opened and the beveled gear 64 rotated by arm 72, the cam 75 on the hook will just reach the left end of the sector arm 68 and thus the hook will not be thrown outwardly. This condition is shown in Figure 6.

In order to prevent any counter-clockwise movement of the large beveled gear, a holding pawl 77 is pivotally mounted on the inside of the cover plate, this pawl having a recess 78 for receiving both the long and short pins. A spring 79 acts on the pawl 77 to hold it in an operative position and also to enable the pins to ratchet by the pawl as the large beveled gear is rotated in a clockwise direction.

On the outer end of the shaft 10 of the conditioning valve element C and just inwardly of the arm 11 is a second arm 80 rotatably mounted on the shaft. Clutch teeth 81 connect this arm with the sleeve 65 so that the arm can rotate the sleeve and the arm 72 which carries hook 73 at its outer end. A rod 82 operatively connects the arm 80 with an arm 83 integral with the hub of the pedal P. Extending from the cover plate 3 are spaced stop pins 84 and 85 which limit the extent of possible movement of the arm 80 to approximately a 45 degree arc. A spring 86 acts on the pedal P to bias the pedal to its retracted position and when in this position the arm 80 will be biased to its position engaging the rear stop 85 on the cover plate as viewed in Figure 1. With the connection as shown to the pedal P, it will be seen that by depressing the pedal it will be possible, by means of the arm 72 and its hook, to rotate the large beveled gear 64 through an arc of 45 degrees, provided, of course, that the hook 73 is released to engage a short or long pin on the large beveled gear. Whenever the pedal is released, the spring 86 will retract the pedal to the full line position shown in Figure 1 and thus the arm 72 will be caused to return to its normal position, as shown in Figure 2, wherein it will be possible for the hook to again engage another short or long pin so that the large beveled gear can be given another rotation in the same direction through an arc of 45 degrees if the pedal P is again depressed.

*Operation*

Referring to the operation of the improved control valve means, let it be assumed that the hand lever H is in its "closed" position and the pedal P is released, such positions being shown in full lines in Figure 1. The conditioning valve element C will be in its closed position as shown in Figure 9. This will place the sector arm 68 in the position shown in Figure 2. The released position of the pedal P will also result in the arm 72 being in the position shown in Figure 2. Both ends of the servomotor M will be connected to atmosphere, irrespective of the position of the servomotor control valve element A. The piston 57 of the servomotor may be at either end of the cylinder 54, depending upon which position the valve element A had assumed at the time the hand lever H was previously placed in its closed position. Under these conditions, as above referred to, any depressing and releasing of the pedal P will have no effect in rotating the valve element A, due to the position of the sector arm 68, since it will be noted from Figure 2 that the hook 73 on the arm 72 will be held in its outward non-operating position by the engagement of the cam portion 75 with the upper left end of the sector arm. Depressing and releasing of the pedal P will merely cause the arm 72 to move from its position shown in Figure 2 to the position shown in Figure 6 and back again without the hook 73 engaging any pin so as to produce a connection between the arm 72 and the large beveled gear 64.

If now the hand lever H should be moved from its "closed" position to its "open" position, as shown by dashed lines in Figure 1, the conditioning valve element C will be opened as shown in Figure 10. The opening of the conditioning valve element C will also place the sector arm 68 in the position shown in Figure 6. If the piston of the servomotor M should be at the right end of the cylinder, shown in full lines in Figure 1, then this piston will remain in such position since the control valve element A is not moved from its position which causes the piston of the servomotor to assume such position at the right end of the cylinder. One of the two positions that the valve element A could be in to place the piston at the right end of the cylinder is shown in Figure 5. With such a position of the valve element A it cannot be disturbed by the movement of the hand lever H to the "open" position and a coinciding movement of the sector arm 68 to the position shown in Figure 6. It will be remembered that the pawl 69 carried by the sector arm 68 is capable of only engaging the long pins L and if the valve element A is in the position shown in Figure 5, no long pin L will be in a position so that it can be engaged by the pawl 69 during the movement of sector arm 68 from the position shown in Figure 2 to the position shown in Figure 6.

However, if the piston 57 should be at the left end of the servo-cylinder 54 when the hand lever H is moved to its open position, then the valve element A will have been left in such a position, as for example that shown in Figure 7, wherein the left end of the servo-cylinder is connected to the passage 23 leading to the tank T and controlled by the conditioning valve C. By such a position of the valve element A a long pin L will then be positioned directly below the pawl 69. Consequently, as the hand lever H is moved to its open position, the coincidental movement of the sector arm 68 will cause the pawl 69 to pick up this long pin and rotate the large beveled gear 64 through a 45 degree arc. This rotation of the large beveled gear will cause a 90 degree rotation of the control valve element A and place this valve element in a position so that the right end of the servo-cylinder 54 will be connected to the passage 23 and the left end of the servo-cylinder to atmosphere. When the hand lever reaches its "open" position, the conditioning valve element C will be in its "open" position, as shown in Figure 10, and thus the right end of the servo-cylinder will be connected to the tank T. Differential fluid pressure will then be so effective on the piston 57 that it will be moved to its right end position as shown in full lines in Figure 1.

It will thus be seen from the foregoing that if the piston 57 of the servomotor is not at the right end of the cylinder 54 when the hand lever H is moved to its "open" position to open the conditioning valve element C, the piston will be immediately placed at the right end thereof, due to the fact that the valve element A is caused to be placed in a position to bring about this movement of the servo-piston. The movement of the piston 57 to the right end of the servomotor cylinder whenever the hand lever H is moved to "open" position will occur irrespective of what position the pedal P may be in at the time the hand lever H is moved to "open" position. If the pedal P should be depressed prior to moving the hand lever H from "closed" to "open" position, the arm 72 will merely be rotated from its position shown in Figure 2 to the position shown in Figure 6, without any movement of the large beveled gear 64, since it will be impossible for the hook 73 to operatively engage a pin on the beveled gear due to the position of the sector arm 68 as shown in Figure 2.

With the conditioning valve element C now "open" and the piston 57 of the servomotor at the right end of the cylinder (a position already existing or caused to occur by the movement of the hand lever H to the open position), it will be possible to bring about a reciprocation of the piston 57 merely by successive depressing movements of the pedal P. With the sector arm 68 moved to the position shown in Figure 6, the hook 73 will now be free to be biased to a position so that it can operatively engage a short pin S on the large beveled gear. As the pedal P is depressed, engagement of the hook 73 with a short pin will result in the arm 72 moving to the position shown in Figure 6 and thus giving the large beveled gear a rotation through a 45 degree arc. The small beveled gear 34, which is meshed with the large beveled gear, will then be given a simultaneous rotation through a 90 degree arc and, consequently, the valve element A will be moved from a position such as that shown by way of example in Figure 5, to the position such as that shown by way of example in Figure 7. The rotation of the valve element A will be in a counterclockwise direction as shown by the arrows in Figures 5 and 7. When the valve element A assumes the position shown in Figure 7, the right end of the servo-cylinder 54 will be connected to atmosphere and the left end will be connected to the tank T. This will cause such a differential fluid pressure to be effective on the piston 57 that it will be moved to the left end of the cylinder. When the pedal P is released, the arm 72 will be rotated back to the position shown in Figure 2 by pedal return spring 86 wherein the hook 73 can then engage a long pin. There will be no danger of the beveled gear being moved with the arm 72 during its return or counterclockwise movement (as viewed in Figure 2), because such will be prevented by the pawl 77.

If now the pedal is again depressed, the large beveled gear will be rotated through another arc of 45 degrees and consequently the valve element A will be rotated through a 90 degree arc. This will result in the right end of the servo-cylinder 54 being connected to the tank T and the left end connected to atmosphere. The piston 57 will then be moved to the right end of the cylinder 54 by the action of the differential fluid pressure thereon.

The piston 57 can be continued to be reciprocated as long as desired, merely by continuing to give successive depressing movements to the pedal P, as will be obvious from the structure described and its manner of functioning. A depressing movement of the pedal P will cause the piston to move from one end of the servo-cylinder to the other. A subsequent depressing movement will then result in the piston moving back to the said one end.

When it is desired to disable the control valve means at any time, and irrespective of the position of the pedal P, it will only be necessary to move the hand lever H from its "open" position to its "closed" position; that is, the full line position shown in Figure 1. This will result in the conditioning valve element C being placed in its closed position, as shown in Figure 9, so that the passage 23 will be in communication with the atmosphere instead of being connected to the tank T. Both ends of the servomotor will then be connected to atmosphere and the piston 57 will remain at the end wherein it happened to be at the time the hand lever H was moved to "closed" position. The closing of the conditioning valve element C will also result in the sector arm 68 assuming the position shown in Figure 2 and when in this position the hook will be positively held in a position wherein it will be impossible for it to operatively engage a long or short pin. Consequently the pedal P can no longer be employed to rotate the valve element A. If, at the time the hand lever H is placed in its "closed" position, the piston 57 should be at the left end of the cylinder 54, then of course when the hand lever H is again returned to the "open" position, the piston will immediately be caused to move to the right end of the cylinder 54 as has already been described. Consequently, whenever the hand lever H is moved to "open" position, the operator will always know that the piston 57 is at the right end of the servo-cylinder. If it were not already there, it would be placed in such position by a movement of the valve element A caused by the rotation of the sector arm 68 connected to the hand lever H.

From the foregoing description it is seen that my improved control valve means for a double-acting fluid servomotor embodies both a conditioning valve element and a control valve element, both of which are controlled by independent personally operated means. Whenever the conditioning valve element is closed, the servomotor will be completely disabled and also it will be impossible to operate the control valve element which is employed to alternately connect opposite ends of the servomotor to a source of pressure different than atmosphere and to the atmosphere. Whenever the conditioning valve element is open so that the servomotor can be operated, it will then be possible to operate the control valve element by operator-operatable means or some other equivalent means so as to cause a reciprocable movement of the servomotor piston. It will also be noted that the valve means employs a rotatable valve element for controlling the reciprocable movement of the servomotor piston 57 and that this valve element is rotated in one direction only. The rotation is caused to be made step-by-step as a result of successive movements of the actuating means which is shown by way of example, as a pedal, but of course may be any kind of a member or means which can have oscillating or reciprocable movement. Whenever the control valve means is disabled and then subsequently conditioned for operation to control the servomotor the piston of the servomotor will always be in a predetermined position.

My improved control valve means has many uses. One of its many uses could be in the control of a change-speed transmission associated with a motor vehicle. When such a use is contemplated the hand lever H could be the equivalent of a gear-shift lever and the pedal P could be a clutch or accelerator pedal. The movement of the piston 57 of the servomotor would be employed to change gear ratios of the transmission. The movement of the servomotor piston 57 to the left end of the cylinder 54 could cause a gear ratio to be operative and the movement of the piston to the right end could cause the transmission to be neutralized. It would also be possible to use the servomotor to engage and disengage a power-transmitting friction clutch during the control of the transmission. The servomotor could also be employed to move an element of a change-speed gear transmission to two different operative positions instead of a gear ratio established position and neutral. Other possible uses of the control means would be in conjunction with a fluid pressure-operated servomotor employed to move any mechanism or means to two operative positions. Although the control of the improved valve means is shown as being accomplished by personally operated means, other means could obviously be employed. Therefore, being aware of the possibility of modifications in the particular structure shown and described, and also the many uses to which the control valve means is readily adaptable by those skilled in the art without departing from the fundamental principles of the invention, it is not intended that the invention be limited in any manner except in accordance with the appended claims.

I claim as my invention:

1. In combination with a fluid pressure actuated servomotor and a source of pressure fluid at a pressure different from atmosphere, means comprising a primary valve element movable to a plurality of operative positions for alternately connecting opposite ends of said servomotor to said source, a shut-off valve element operatively interposed between said primary valve element and said source, means for actuating said primary valve element to its said plurality of positions, and means operable independently of said first-named means for actuating said shut-off valve element and for simultaneously actuating said primary valve element to a predetermined one of its said plurality of positions in the event that said primary valve element has not been so actuated by said first-named means.

2. In combination with a fluid pressure actuated servomotor and a source of pressure fluid at a pressure different from atmosphere, a rotatable valve element having a plurality of rotative positions at which the valve is opened to connect opposite ends of said servomotor to said source, means for selectively rotating said valve element to establish said positions, and personally-operable means effective independently of said first-mentioned means for rotating said valve element to one of its said positions to connect one end of said servomotor to said source in the event that said valve element has not been so positioned by operation of said first-mentioned means, said means both including a common gear train operatively connected to said valve element and separate clutch means for selective actuation by said means to render said gear train effective.

3. In combination with a fluid pressure actuated servomotor and a source of pressure fluid at a pressure different from atmosphere, a movable valve element actuatable to separate positions for connecting opposite ends of said servomotor to said source, means for selectively actuating said valve element to establish said positions, personally-operable means effective independently of said first-named means for actuating said valve element to a predetermined one of its plurality of positions in the event that said valve element has not been so actuated by said first-named means, a shut-off valve means between said valve element and said source, and means for opening said shut-off valve means by operation of said personally-operable means despite the effectiveness of said personally-operable means in actuating said valve element.

4. In combination with a fluid pressure actuated servomotor and a source of pressure fluid at a pressure different from atmosphere, a rotatable valve element actuatable to separate rotative positions at which said element is effective to connect opposite ends of said servomotor to said source, a shut-off valve operatively interposed between said valve element and said source and having an open position for establishing communication therebetween, and a plurality of personally-operable means each individually operable to actuate said valve element to a predetermined position for connecting one of said ends of said servomotor to said source, one only of said means also being operable to actuate said shut-off valve to its said open position, and said one of said means being rendered ineffective to actuate said valve element to said predetermined position when said valve element has been conditioned to said predetermined position prior to actuation of said shut-off valve.

5. In combination with a fluid pressure actuated servomotor and a source of pressure fluid at a pressure different from atmosphere, a rotatable valve element having a plurality of open rotative positions for connecting opposite ends of the servomotor to the source, actuating means for indexing said valve element in step-by-step movements in a single direction to its said rotative positions, and means operable independently of said actuating means for similarly indexing said valve element to an open position for connecting a selected end of the servomotor with the source if the same end has been so connected as a result of previous operation of said actuating means.

6. In combination with a fluid pressure actuated servomotor and a source of pressure fluid at a pressure different from atmosphere, a rotatable valve element having a plurality of open rotative positions for connecting opposite ends of said servomotor to said source, actuating means for indexing said valve element in step-by-step movements in a single direction to its said rotative position, a shut-off valve operatively interposed between said valve element and said source for controlling the communication of pressure fluid with said valve element, and means operable independently of the actuating means for operating said shut-off valve, said last-mentioned means being operatively connected to said rotatable valve element for indexing said valve element in a manner similar to said actuating means, said last-mentioned means being effective to connect the selected end of the servomotor with the source during opening movement of said shut-off valve only if the same end has not been so connected as a result of previous operation of said actuating means.

7. In combination with a fluid pressure actuated servomotor and a source of pressure fluid at a pressure different from atmosphere, means comprising a movable valve element having openings for connecting opposite ends of said servomotor to said source, means for moving the valve element to its different open positions, a shut-off valve element between said source and said movable valve element, means operable independently of the moving means for operating said shut-off valve element, and means also operable by the independently operable means when moved to open said shut-off valve element for conditioning the movable valve element to place the selected end of said servomotor in communication with said source if not so connected as a result of previous operation of its moving means.

8. In combination with a fluid pressure actuated servomotor and a source of pressure fluid at a pressure different from atmosphere, a rotatable valve element having a plurality of operative rotative positions for alternately connecting opposite ends of said servomotor to said source, a reciprocable foot-operated element, means for operatively connecting said foot-operated element to said rotatable valve element for rotating the same to its said operative positions including means for converting linear reciprocation of said foot-operated element to rotative movement of said valve element and means limiting rotation of said valve element to a single direction despite reciprocation of said foot-operated element, and a hand-operated element also operatively connected to said rotatable valve element for rotating the same to its said operative position to place a selected end of said servomotor in communication with said source only when said valve element has not been rotated to said servomotor and said source as a result of previous operation of said foot-operated element.

9. In control valve means for alternately connecting opposite ends of a fluid pressure actuated servomotor to a source of pressure fluid different from atmosphere and to the atmosphere, a valve casing having spaced openings communicating with said opposite ends of said servomotor and with the atmosphere, a movable valve element having a plurality of separate openings selectively registerable with the openings of said casing to establish communication of said opposite ends of said servomotor with said casing openings respectively, a plurality of personally-operable means each individually operable to actuate said valve element to a predetermined position within said casing for connecting one of said ends of said servomotor to said source and the other of said ends of said servomotor to the atmosphere, said plurality of personally-operable means including a primary means for primarily effecting valve element movement to said predetermined position and a secondary means effective to cause valve element movement to said predetermined position only if said valve element has not been previously moved to said predetermined position by said primary means.

10. In a control valve means for alternately connecting opposite ends of a fluid pressure actuated servomotor to a source of pressure fluid at a pressure different from atmosphere and to the atmosphere, a movable valve element having different operative positions at which said alternate connections are effected, and a pair of relatively movable actuating elements each individually operable to actuate said valve element to a predetermined position for connecting one of said ends of said servomotor to said source and the other of said ends of said servomotor to the atmosphere, and cooperable means movable with said elements for rendering said second element ineffective to actuate said valve element to said predetermined position when said element has been moved to said position by movement of said other actuating element prior thereto.

11. In control valve means for alternately connecting opposite ends of a fluid pressure actuated servomotor to a source of pressure fluid at a pressure different from atmosphere and to the atmosphere, a rotatable valve element having radially arranged passages, means for connecting the inner ends of alternate passages to the source and to the atmosphere respectively, a pair of ports for connection with opposite ends of said servomotor and arranged so that each outer end of a radial passage can be connected with one of said ports by rotation of said valve element and when so connected an alternate passage will be connected to said other port, and means for rotating the valve element including a pair of relatively rotatable actuating elements each independently operable to actuate said valve element to a predetermined position for connecting one of said ends of said servomotor to said source, and cooperable means movable with said actuating elements for rendering one of said actuating elements ineffective to actuate said valve element to said predetermined position when said element has been placed in said position by the other of said actuating elements.

12. In control valve means for alternately connecting opposite ends of a fluid pressure actuated servomotor to a source of pressure fluid at a pressure different from atmosphere and to the atmosphere, a rotatable valve element having radially arranged passages, means for connecting the inner ends of alternate passages to said source and to said atmosphere, a pair of ports for connection with opposite ends of said servomotor and arranged so that each outer end of a radial passage can be connected with a port by a rotation of said valve element and when so connected an alternate passage will be connected to the other of said ports, a first means for rotating said valve element to bring said passage into registry with said ports, and a second alternative means also effective to rotate said valve element to bring said passages into registry with said ports, said second means being operative for rotating said valve element only if said valve element has not previously been rotated to bring the same of said passages into registry with the same of said ports.

13. In control valve means for alternately connecting opposite ends of a fluid pressure actuated servomotor to a source of pressure fluid at a pressure different from atmosphere and to the atmosphere, a rotatable valve element having different open positions during a complete rotation thereof to effect the alternate connections with said servomotor, a rotatable member operatively connected to said valve element to thereby rotate said valve element, an oscillatable arm, means for oscillating said arm, means for operably connecting said arm with said rotatable member so that the latter will be rotated through a predetermined arc only during movement of said arm in one direction of its oscillatable movement, a shut-off valve means operable for connecting said rotatable valve element to said source when open and for disconnecting said rotatable valve element from said source when closed, and means for disabling the connection between said arm and said rotatable member when said shut-off valve means is in closed position.

14. In a control valve means for alternately connecting opposite ends of a fluid pressure actuated servomotor to a source of pressure fluid at a pressure different from atmosphere and to the atmosphere, a rotatable valve element actuatable to different open positions during a complete rotation thereof to make the alternate connections with the said servomotor, a rotatable member operably connected to said valve element to thereby rotate said valve element, an oscillatable arm, means for oscillating said arm, and means for operatively connecting said arm with said rotatable member so that said member will be rotated through a predetermined arc during movement of said arm in only one direction of its oscillatable movement, shut-off valve means operable for connecting said rotatable valve element with said source when open and for disconnecting the same therefrom when closed, means for disabling the connection between said arm and said rotatable member when said shut-off valve means is in closed position, and means for rotating said valve element to a predetermined one of its open positions if said valve element is not so positioned when the shut-off valve means is opened.

15. In a control valve means for alternately connecting opposite ends of a fluid pressure actuated servomotor to a source of pressure fluid at a pressure different from atmosphere and to the atmosphere, a rotatable valve element actuatable to different open positions during a complete rotation thereof to make the alternate connections with said servomotor, a gear operatively connected with said valve element, a second gear meshing with said first gear, pins on said second gear, an oscillatable arm, means for oscillating said arm, and means on said arm for engaging one of said pins to rotate said second gear only when said arm is moved in one direction of its oscillatable movement.

16. In a control valve means for alternately connecting opposite ends of a fluid pressure actuated servomotor to a source of pressure fluid at a pressure different from atmosphere and to the atmosphere, a rotatable valve element actuatable to different rotative positions during a complete rotation thereof to establish the alternate connections with said servomotor, a gear operatively connected to the valve element, pins on said gear, an oscillatable arm, means for oscillating said arm, means on said arm for engaging one of said pins and rotating said gear only when the arm is moved in one direction of its oscillatable movement, and personally-operable means for preventing said last-named means from engaging said pin.

17. In a control valve means for alternately connecting opposite ends of a fluid pressure actuated servomotor to a source of pressure fluid at a pressure different from atmosphere and to the atmosphere, a rotatable valve element actuatable to different rotative positions during a complete rotation thereof to establish the alternate connections with said servomotor, a gear connected with said valve element, a second gear meshing with said first gear, alternate long and short pins circumferentially spaced on said second gear, an oscillatable arm, means for oscillating said arm, means on said arm for successively engaging long and short pins and rotating said second gear through an arcuate distance equal to the spacing between said pins when said arm is moved in one direction only of its oscillatable movement, movable means for preventing said last-named means from engaging any pin, and means operable when said preventing means is moved from its preventing position for engaging one of said long pins only and rotating said second gear through an arcuate distance equal to the spacing between the pins if said gear is in a position wherein said long pin can be engaged.

18. In control valve means, a casing having a cylinder, a cylindrical valve element rotatably mounted in said cylinder and having a central bore and radial passages extending therefrom in a single plane and spaced apart at equal angles, means for connecting the bore of said element to a source of pressure fluid at a pressure different from atmosphere, a cupped member positioned in the bore of said element and having its open end communicating with the atmosphere, said cupped member having walls spaced from the inner end of alternate radial passages and other walls engaging a wall of said bore at the inner ends of the other radial passages and being provided with holes for accommodating communication of said other radial passages with the interior of said cupped member, said casing having two ports entering said cylinder at spaced-apart points so that two adjacent radial passages can simultaneously communicate therewith, and means for rotating said valve element.

19. In control valve means, a casing having a cylinder, a cylindrical valve element rotatably mounted in said cylinder and having a central bore and radial passages extending therefrom in a single plane, said radial passages being spaced apart at equal angles, means for connecting the bore of said element to a source of pressure fluid at a pressure different from the atmosphere, a cupped member positioned in the bore of said element and having an open end communicating with the atmosphere, said cupped member having walls spaced from the inner end of alternate radial passages and other walls engaging the wall of said element bore at the inner ends of the other radial passages and being provided with holes for permitting said other radial passages to communicate with the interior of said cupped member, said casing having two ports entering said cylinder at such spaced-apart points that two adjacent radial passages can simultaneously communicate therewith, means for rotating said valve element in step-by-step movements equal to the angle between said radial passages, and means for cutting off communication with said bore and simultaneously preventing rotation of said valve element.

GLENN T. RANDOL.

REFERENCES CITED

The following references are of record in the file of this patent:

UNITED STATES PATENTS

| Number | Name | Date |
|---|---|---|
| 312,126 | Kells | Feb. 10, 1885 |
| 868,745 | Woods | Oct. 22, 1907 |
| 918,918 | Rutan | Apr. 20, 1909 |
| 1,075,733 | Simon | Oct. 14, 1913 |
| 1,256,602 | Slaw | Feb. 19, 1918 |
| 1,511,656 | Congdon | Oct. 14, 1924 |
| 1,740,877 | Sharp | Dec. 24, 1929 |
| 2,246,379 | Muir | June 17, 1941 |
| 2,258,068 | Randol | Oct. 7, 1941 |
| 2,272,095 | Nathan | Feb. 3, 1942 |
| 2,421,194 | Given | May 27, 1947 |

FOREIGN PATENTS

| Number | Country | Date |
|---|---|---|
| 19,564 | Great Britain | of 1903 |
| 579,740 | France | Aug. 11, 1924 |